United States Patent Office 3,432,075
Patented Mar. 11, 1969

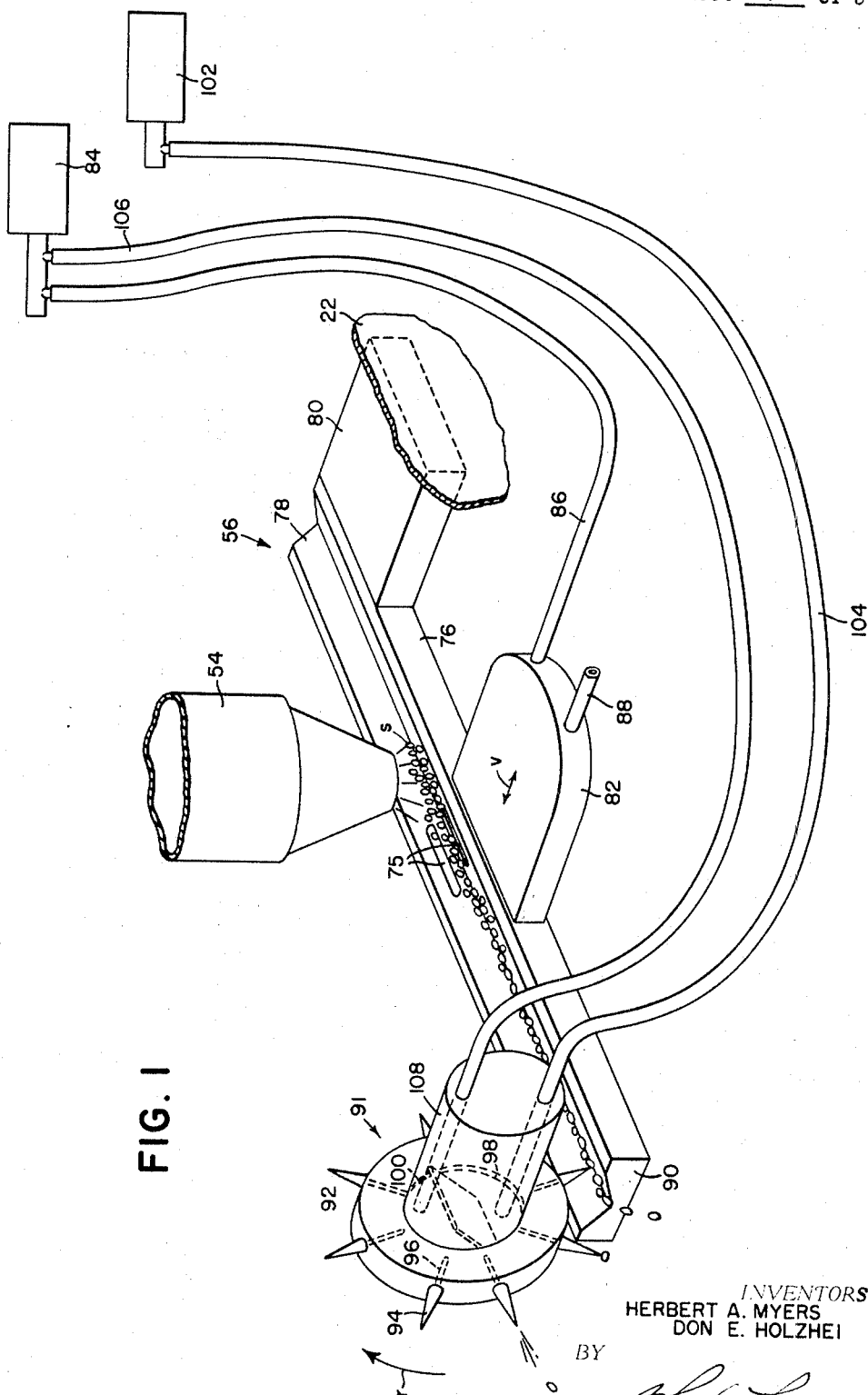

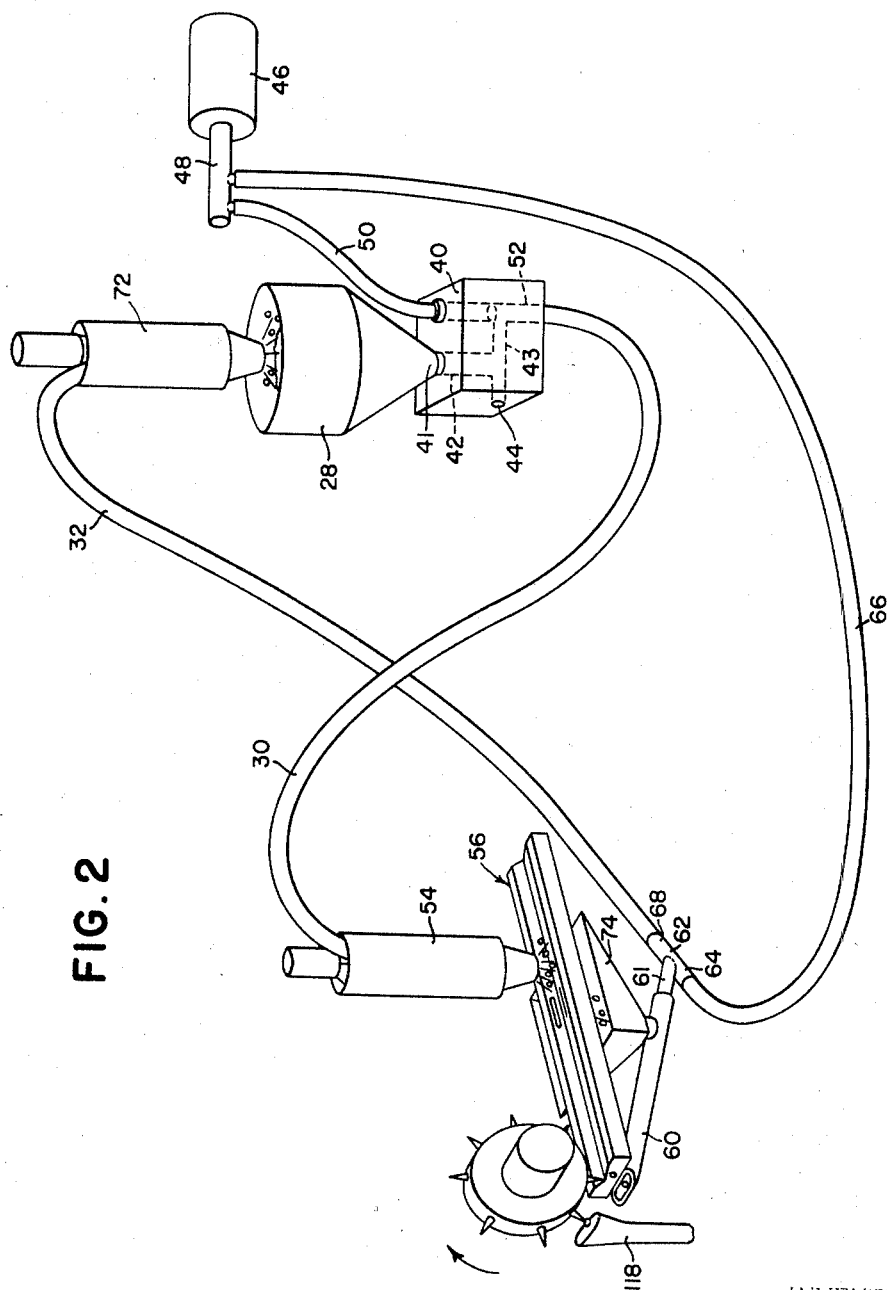

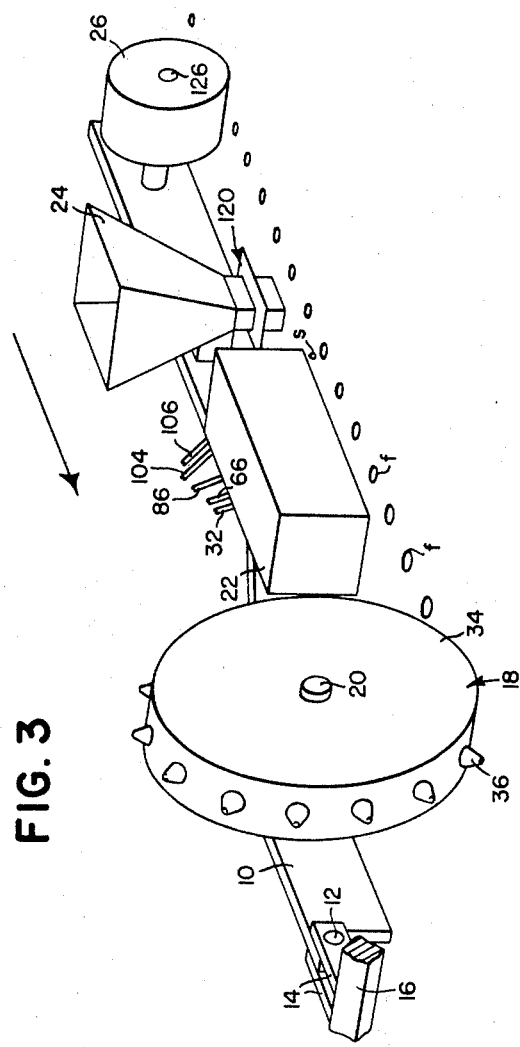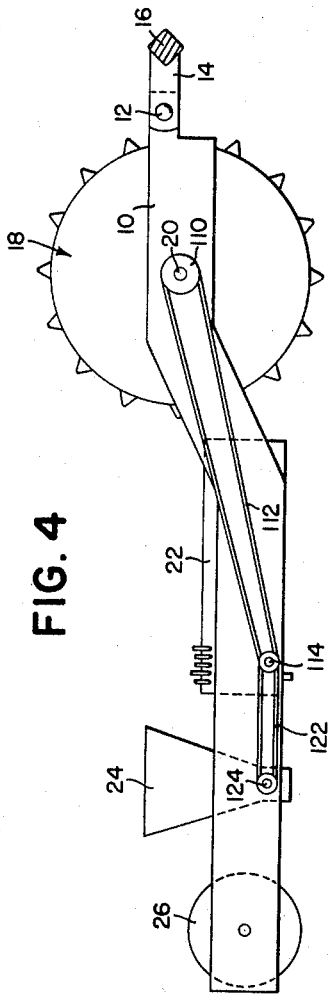

3,432,075
PRECISION SEED PLANTING APPARATUS
AND METHOD
Herbert Arthur Myers, Coal Valley, and Don Earl
Holzhei, East Moline, Ill., assignors to Deere
& Company, Moline, Ill., a corporation of
Delaware
Filed Mar. 3, 1967, Ser. No. 620,483
U.S. Cl. 221—178                                    5 Claims
Int. Cl. B65g 9/04, 3/08

ABSTRACT OF THE DISCLOSURE

A precision seed planting apparatus in which seeds are placed in a transversely vibrating trough which causes the seeds to be oriented and moved past a vacuum seed pickup head in single file, the pickup head discharging picked seeds onto the ground, the planted seeds then being covered with an anti-crustant material such as vermiculite.

---

The present invention relates generally to agricultural equipment and more particularly to an apparatus and method for planting individual seeds in predetermined spacing.

In the past it has been the practice when planting vegetable crops such as lettuce to overplant and then to thin the emerging crops to the desired stand where individual plants have a desirable spacing from adjacent plants. One reason for overplanting has been poor germination rates. Thus only 50 percent of conventionally planted lettuce seeds will emerge. Sugar beets have only a 70–75 percent emergence and other crops which have small irregular seeds also have poor emergence rates. A process has recently been developed which significantly improves the germination percentage of these crops, this process being fully disclosed in companion U.S. patent application Ser. No. 617,566 invented by Arland Pauli and Gordon Van Riper. According to the Pauli and Van Riper process high density seeds are selected and are treated by placing them in a solution of 25 parts per million kinetin (6-furfurylaminopurine) and Hoagland complete nutrient solution. The treated seeds are then air dried and planted without further treatment, preferably under an anti-crustant material such as vermiculite.

Prior to this time no planter has been designed for planting small and irregularly shaped seeds which is capable of selecting individual seeds without a high percentage of doubles and misses. Most of the commercial planters with which applicants are familiar employ a rotating apertured seed wheel to select the seeds, the seeds being received within the apertures and transported to a discharge point. While a recently introduced planter having an inclined seed plate has achieved fairly good results it is still necessary to overplant with this planter to ensure a satisfactory stand.

It is an object of this invention to provide a planter which is capable of planting individual seeds at preselected spaced apart intervals, the seeds being of relatively small size and/or irregularly shaped.

More particularly it is an object of this invention to provide a seed orienting, selecting and discharging mechanism which includes means to orient and advance a plurality of seeds in single file through a pickup area, suction pickup means which pick up individual seeds from the single file, and means to discharge the picked up seeds to the ground.

It is a further object of this invention to provide a seed planting mechanism having soil opening means, a trough onto which a plurality of seeds are conveyed, the trough being downwardly inclined and transversely vibrated whereby the seeds are caused to be advanced in single file past a rotary apertured pickup device which picks up individual seeds by suction and discharges them to the ground, the seeds on the ground being covered with vermiculite or similar non-crusting material.

It is a further object of this invention to provide a method of planting seeds wherein the seeds are caused to be advanced in single file and are selected individually from the single file.

These and other objects and advantages of this invention will be apparent to those skilled in the art after a consideration of the following detailed description, taken in conjunction with the accompanying drawings in which a preferred form of this invention is illustrated.

FIG. 1 is a schematic perspective view illustrating applicants' novel mechanism for orienting, selecting and discharging seeds.

FIG. 2 is a view similar to FIG. 1 which illustrates the manner in which seeds are transported to and from the seed orienting, selecting and discharging mechanism from and to a central seed hopper, respectively.

FIG. 3 is a perspective view of a portion of the planter showing a single row unit including a furrow opening device, the housing for the seed orienting, selecting and discharging mechanism, the vermiculite dispenser, and the press wheel.

FIG. 4 is a side view of the unit planter shown in FIG. 3.

Referring first to FIGS. 3 and 4 a planter unit is shown for placing seeds in a single row, the planter unit including a fore-and-aft extending main frame 10 which is pivotally secured by means of a pivot pin 12 to spaced apart rearwardly projecting ears 14 carried by a toolbar 16, the toolbar in turn being caused to be propelled forwardly over a field by a conventional farm tractor. A furrow opening device 18 is mounted for rotation on axle 20 which is journaled through the frame 10. Disposed to the rear of the furrow opening device is the housing 22 for the seed selecting and dispensing mechanism, the housing being rigidly secured to the frame 10. To the rear of the housing 22 is a hopper 24 which carries vermiculite that may be dispensed onto the seed within the openings $f$ formed by the furrow opener 18. Disposed to the rear of the vermiculite hopper 24 is a conventional press wheel 26 which firms the vermiculite over the seed $s$ deposited within the furrow openings $f$. The seed is conveyed to the seed orienting, selecting and dispensing mechanism within housing 22 from a central seed hopper 28 (FIG. 2) which may be mounted on the tractor, or, preferably, upon the toolbar frame 16, the seed being conveyed through conduit means 30. Excess seed is returned to the central seed supply 28 by means of a seed return conduit 32.

The furrow opening device 18 may be in the form of a wheel 34 having on its radially outer surface a plurality of conical projections 36 which form the furrow openings $f$. By employing this form of opening device less vermiculite is required to cover the seed $s$ and erosion of the vermiculite is materially reduced. However, if desired, the seeds may be planted in a continuous furrow.

The seed orienting, selecting and dispensing mechanism is shown in FIGS. 3 and 4 as disposed within a housing or frame 22 and has three subsystems, one of them being a seed transport subsystem which is schematically illustrated in FIG. 2, and the others being a seed orienting and advancing subsystem and a seed pickup and discharge subsystem, both being shown in FIG. 1.

Referring first to FIG. 2 which shows the seed transport system, the supply of seeds from which individual seeds are selected is normally contained within a central hopper 28. As previously mentioned this central hopper may be disposed on the tractor but is preferably carried by the frame of the planter. A distributor 40 is mounted below an opening 41 in the seed hopper 28 and receives seeds from the hopper through a first passage 42. (It should be noted that while only one distributor 40 and opening 41 are shown in FIG. 2, there will be as many distributors and openings as there are rows to be planted.) Each distributor has a first passage 42 which receives the seeds from the opening 41. A second passage 43 interconnects the first passage 42 with a third passage 52. An air vent 44 which terminates at the junction of the first and second passages permits air to be drawn from the atmosphere into the second passage 43. A blower 46 (which is preferably mounted on the planter frame 16, and which is driven from either the tractor PTO or from a rotary hydraulic motor driven from a source of fluid under pressure on the tractor) delivers air through an outlet tube 48. A portion of the air from the outlet tube 48 is carried through tube 50 to the third passage 52 on the distributor 40. The air flow through the third passage 52 creates a partial vacuum in the second passage 43 in communication with the tube 50 causing the seed to be drawn into passage 52 and then be blown through a tube 30 to a cyclone decelerator 54 disposed over the seed orienting and advancing mechanism 56.

The seed orienting, selecting and discharge mechanism is so designed and constructed, as will be more fully brought out below, that not all seeds delivered to it will be discharged and therefore it is necessary to provide means to return the excess seeds back to the central hopper 28. To this end a first receiver 60 is mounted below the seed orienting and advancing mechanism the seed receiver conveying the seed to be returned to an arm 61 of a Y-shaped fitting 62. The other arm 64 of the fitting 62 is connected to the blower 46 through an air supply tube 66 and the seed flowing through the first arm 61 will be entrained in the airstream entering the Y-shaped fitting through the second arm 64 and be discharged through leg 68 and conduit 32 to a cyclone decelerator 72, the seeds being dropped from the decelerator 72 into the seed supply hopper 28. It should be noted at this point that it is necessary to employ the cyclone decelerators since if the seed were not decelerated prior to being deposited on the seed orienting and advancing mechanism 56 or the supply hopper 28 that the velocity is such that the seeds would bounce all over the place.

In some instances too many seeds will be delivered to the seed orienting and advancing mechanism 56. If too many seeds are delivered it will not be possible to properly orient and advance the seeds past the seed pickup mechanism. Therefore it may be necessary to provide a second receiver 74 which will receive excess seeds through opening 75 (FIG. 1) in the seed orienting and advancing mechanism.

The seed orienting and advancing mechanism 56 (FIG. 1) consists essentially of an inclined bar 76 having a V-shaped groove 78 formed in its upper surface. The upper end of the bar 76 is rigidly secured to the housing by means of a mounting block 80. An orbital vibrator 82, which may be of the type shown in U.S. Letters Patent 2,675,777, is secured to one side of the bar between the ends thereof. The vibrator is actuated through a flow of air received from a blower 84 (which may be the same as blower 46) through a connecting line 86, the air being discharged from the vibrator 82 into the atmosphere through port 88. The vibrator will cause the bar 76 to vibrate transversely in the direction indicated by the double arrow v. It should be noted in this respect that the amplitude of vibration is least nearest the point where the bar is connected to the housing 22 and is greatest at the free end 90.

Disposed over the free end 90 of the bar 76 is the seed pickup and discharge mechanism 91. This mechanism includes an annular member 92 which has radially outwardly projecting hollow needles 94. The needles are connected to the hollow interior of the annular member 92 by means of passages 96. The interior of the annular member 92 is divided into two chambers 98 and 100 which are interconnected with a suction line and a high pressure air line, respectively. To this end the chamber 98 is connected with a suction pump 102 through a line 104, and the high pressure chamber 100 is connected with the blower 84 through line 106. The annular member 92 is supported for rotation on a cylindrical member 108 through which the lines 104 and 106 pass. As can be seen from FIG. 4, the seed pickup and discharge mechanism 91 is caused to be rotated from the furrowing wheel which has fixed on one end of its axle 20 a sheave 110 over which an endless belt 112 is disposed, the other end of the belt 112 being disposed over one part of a double sheave 114 which is in turn connected with the annular member 92.

The operation of the seed orienting and advancing mechanism is as follows: The seed is transported from the supply hopper 28 to the cyclone decelerator 54 by means of an airstream and falls onto the V-shaped groove 78 formed in the upper surface of the bar 76. As the bar is inclined, with the free end 90 being lower than the fixed end, the seeds will be advanced towards the free end when vibrated by vibrator 82. If excess seed is present in substantial amounts it will pass through openings 75 into receiver 74 permitting only a sufficient amount of seeds to pass down along the vibrating trough to ensure that a single file of seeds will be advanced past the pickup mechanism. As the seeds progress down the V-shaped trough they will be vibrated with increasing amplitude until they reach the free end 90. The increasing amplitude of vibration will cause the seeds to narrow down to an uninterrupted single file flow past the pickup station, the vibrations also causing those seeds that are elongated to orient themselves with their long dimension parallel to the V-shaped groove. It is necessary that the seeds be in single file to prevent side-by-side seeds from being picked up together.

Grooves of various shapes have been tried experimentally, including grooves of 90° and 60°, as well as one having a flat bottom and parallel sides. Best results were achieved with a groove having a 60° included angle. Also different frequency and amplitude combinations have been tried. In a system having a natural frequency of 7000 cycles per minute in which the bar was disposed at a 13° angle, best results were obtained at frequencies of 9–13,000 cycles per minute with an amplitude at the free end of 0.022 inch. At frequencies below 9000 it was found that the amplitude of the free end was too great causing the seeds to jump out of the trough. At frequencies above 13,000 the amplitude was not enough to create an even flow of the seeds down the trough.

The seed pickup and discharge mechanism will rotate in such a manner that the ends of the needles 94 will generally pass through the oriented seeds at a rate preferably in excess of the speed of the seeds, the seeds being caused to be attached to the open end of the needles 94 by virtue of suction. As the annular member is rotated in the direction indicated by the arrow r, the interior of the needles will pass from communication with the suction chamber 98 to the high pressure chamber which will cause the seeds to be blown off the needle. (The air ejection of the seeds also cleans the needle.) The ejected seed will be received within a seed tube 118 whose lower end extends through the bottom wall of housing 22. The rotational speed of the needles 94 carried by the annular member 92 is synchronized with the press wheel 18 in such a manner that an individual seed s will be deposited in the bottom of each furrow opening f. Those seeds which are not picked up by the seed pickup and discharging mechanism 91 will be returned to the central seed hopper 28 through the first seed receiver 60.

A hopper 24 is disposed to the rear of the seed orienting, selecting and dispensing mechanism and is provided with means for depositing vermiculite over each of the furrow openings f that have received the seed s. To this end a dispensing mechanism 120 at the bottom of the hopper is caused to be operated through a belt 122, one end of which is disposed over a portion of the paired sheave 114 and the other end of the endless belt 122 being disposed over sheave 124 which is drivingly interconnected with the dispensing mechanism 120. While the details of the dispersing mechanism 120 are not shown, it should be noted that its operation is so timed that the vermiculite to be dispensed is deposited in individual clumps over the furrow openings *f*.

The firming roller 26 which is rotatably disposed on axle 126 carried to the rear of the main frame 10 merely packs down the anti-crustant material or vermiculite and the seed. It may be desirable to add a binder to the vermiculite to prevent it from being eroded away by high winds, and to this end a spray nozzle, not shown, may be mounted to the rear of the firming wheel 26 to eject binding material onto the clumps of vermiculite.

In summary, it should be noted that the foregoing structure permits the farmer to plant a single seed in contact with moist firm soil at a precise depth below the surface, the seed being covered with an anti-crustant material which will permit the inherently weak vegetable seed to emerge. While our planting apparatus has been designed for use with relatively small vegetable seeds, such as for example lettuce, which have preferably been treated in accordance with the previously mentioned Pauli and Van Riper method, our system will be usable with other forms of seeds which may have been treated in different manners or which have not been treated at all.

What is claimed is:

1. A seed selecting and discharge mechanism comprising: means to advance a plurality of seeds in single file through a pickup area, means to pick up and discharge individual seeds, said pickup means including a suction seed pickup operable to pick up a portion of the seeds one at a time from the plurality of seeds passing through the pickup area and to convey the individual picked seeds to a discharge point, and means to convey a plurality of seeds to said means to orient and advance from a supply of seeds, the excess seeds being returned to said supply, said means to convey and return the seeds comprising conduits through which is maintained an air flow sufficient to propel said seeds.

2. The mechanism set forth in claim 1 in which means to decelerate the seeds are placed at the end of the conveying means.

3. The mechanism set forth in claim 1 in which said orienting and advancing mechanism comprises an inclined elongated member having a V-shaped groove in its upper surface, said member being fixed at its upper end and free at its other end, said seeds being placed on said member above the pickup area, and means to vibrate the member whereby when seeds are placed on the member they will be advanced in single file past the pickup area.

4. The mechanism set forth in claim 1 in which openings are formed in said member to either side of the V-shaped groove, and additional means are provided to return excess seeds to said supply, said additional means being disposed below said openings and receiving those excess seeds that pass through the openings.

5. Seed orienting, selecting and discharging mechanism for use with a frame adapted to be propelled forwardly over a field, said mechanism comprising: an inclined elongated bar fixed at its upper end to said frame, said bar being formed with an upwardly facing V-shaped groove, means to deposit seed onto said bar, means to vibrate the bar transversely, a rotary pickup device carried on said frame and having a plurality of outwardly extending apertured members which are advanced through the lower end of said V-shaped groove below the area of the seed deposition, said apertures being interconnected with a suction line when they pass through said groove to cause seeds in the groove to adhere to said apertured members, and means to cause said seeds to be removed from said apertured members.

References Cited

UNITED STATES PATENTS

| 2,737,314 | 3/1956 | Anderson | 221—211 XR |
| 3,100,462 | 8/1963 | Steele et al. | 111—34 |
| 3,142,274 | 7/1964 | Winter | 221—211 XR |
| 3,380,626 | 4/1968 | Giannini | 221—211 XR |

ROBERT E. BAGWILL, *Primary Examiner.*

U.S. Cl. X.R.

47—9; 111—91, 77; 221—211